United States Patent [19]

van den Bussche

[11] 4,307,412
[45] Dec. 22, 1981

[54] TELEVISION COLOR CORRECTION CIRCUIT

[75] Inventor: Willem van den Bussche, Eindhoven, Netherlands

[73] Assignee: U.S. Philips Corporation, New York, N.Y.

[21] Appl. No.: 163,370

[22] Filed: Jun. 26, 1980

[30] Foreign Application Priority Data

Jul. 3, 1979 [NL] Netherlands .................. 7905159

[51] Int. Cl.³ .................. H04N 9/535; H04N 1/46
[52] U.S. Cl. .................................. 358/27; 358/80
[58] Field of Search .......................... 358/27–29, 358/75, 80, 54

Primary Examiner—John C. Martin
Attorney, Agent, or Firm—Thomas A. Briody; William J. Streeter; Laurence A. Wright

[57] ABSTRACT

A television color correction circuit which is particularly advantageous for converting, for example, a film, a slide or a photograph into color television signals, each signal channel (2) including a pulse adder (5) and pulse separating circuit (11), respectively, coupled to an input (1) and output (3), respectively, for processing a pulse having a predetermined amplitude and occurring in line blanking periods. The outputs of the pulse separating circuits (11) are connected to a pulse adder and comparator circuit (19) for performing a pulse addition with predetermined factors and for comparing the pulse amplitude of the summed pulse with a reference value Uref, the d.c. voltage-carrying output (20) of this circuit (19) being connected to a control input (30) of a controllable amplifier circuit (7G') included in one (2G) of the signal channels (2), the other signal channels (2R, 2B) having been provided with adjustable amplifier circuits (7R, 7B). A color correction may be performed over a wide range, a constant luminance value being present independent of the change in the gain factors.

6 Claims, 1 Drawing Figure

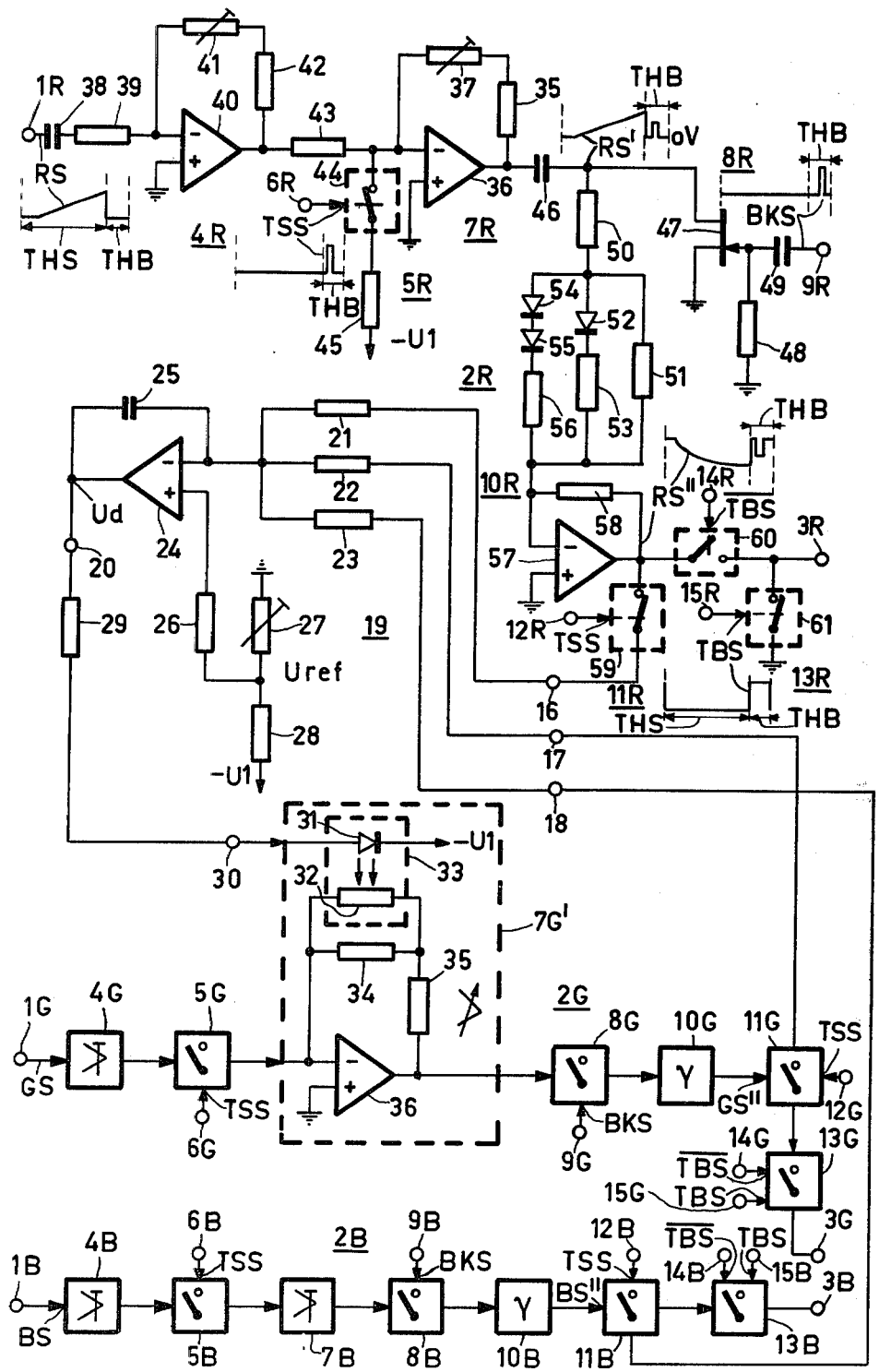

TELEVISION COLOR CORRECTION CIRCUIT

The invention relates to a television colour correction circuit comprising at least three signal channels each having an input, an output and variable amplifier circuits arranged therebetween.

Such a circuit is described in the German Auslegeschrift No. 1,294,451, where the correction of colour television signals derived from colour films is mentioned as field of usage. A further use may be in the conversion of slides and photographs into colour television pictures and for studio television or outdoor television. A colour correction is required for colour films for many different reasons, which are mentioned in the Auslegeschrift. To perform the correction it is proposed to couple the variable amplifier circuits in a combination of three signal channels and to make them manually adjustable, a maximum gain in each channel being accomplished with a different setting, the gain having a correspondingly lower value in each one of the other signal channels. To this end the circuit is provided with a plurality of coupled switches having twelve selection contacts to which voltage dividers formed with resistors are connected.

It is an object of the invention to provide a colour correction circuit of an electronic implementation instead of the given construction, which is mainly mechanical with all its inherent drawbacks and by means of which only twelve predetermined colour corrections can be performed. It is further accomplished that a luminance signal assembled from colour signals in a predetermined ratio has a constant value independent of the variation in the gain factors of the amplifier circuits, that is to say: the local colour change does not affect the local brightness. A colour correction circuit according to the invention is therefore characterized in that each signal channel includes a pulse insertion circuit coupled to the input and inserting a pulse occurring in the line blanking periods with a predetermined amplitude into the signal applied to the input, a pulse separating circuit coupled to the output and separating the said pulse from the output signal, the outputs of the pulse separating circuits being connected to inputs of a pulse adder and comparator circuit for performing a pulse addition with predetermined factors and for comparing the pulse amplitude of the summed pulse with a reference value, the d.c. voltage-carrying output of the pulse adder and comparator circuit being connected to a control input of a controllable amplifier circuit provided in one of the said signal channels, adjustable amplifier circuits having been provided in the other signal channels.

It should be noted that it is known from the periodical "SMPTE Journal", Vol. 87, no. 2, February 1978, pages 73–76, to realize an automatic colour correction circuit in which reference pulses are utilized which occur in certain line periods during field blanking periods, these reference pulses being applied to the inputs and taken from the outputs for the correction of a performed signal processing action. The automatic colour correction circuit is based on statistical assumptions about the information to be corrected and measures are proposed to prevent large errors from being introduced when the assumptions are not satisfied. The result is a complicated circuit in which the colour correction is carried out at field frequency.

The present patent application relates to an adjustable, non-automatic colour correction circuit of a simple structure, advantageous use further being made of reference pulses which occur in line blanking periods during scanning periods.

A colour correction circuit which operates optimally in practice, comprising the sole controllable and several adjustable amplifier circuits can be obtained when it is characterized in that the signal channel comprising the controllable amplifier circuits is intended to process a colour signal corresponding with green light, two further signal channels comprising adjustable amplifier circuits being present, which are intended to process colour signals or colour difference signals which correspond to red and blue light, respectively.

A further, advantageous construction is characterized in that the said predetermined factors at the pulse addition have a ratio which is substantially equal to 30:59:11 for the signal channels corresponding with signals of red, green and blue light, respectively.

A circuit according to the invention is not only suitable for colour correction but can also be used for further purposes, and one construction is therefore characterized in that a gamma amplifier circuit is provided in the signal channel between the pulse inserting and pulse separating circuits.

A colour correction circuit comprising a simple construction of the pulse adder and comparator circuit is characterized in that the pulse adder and comparator circuit is included in a signal sample-and-hold circuit.

A further construction is characterized in that a signal sample-and-hold circuit comprises an integrating differential amplifier, a first input of which which carries a voltage of the reference value and a second input, via resistors having different values, the resistance ratio of which correspond substantially with the reciprocal values of the said predetermined factors, are connected to outputs of the pulse separating circuits in the signal channels, these circuits being part of the signal sample-and-hold circuit.

The invention will now be further explained with reference to the accompanying FIGURE by way of example for a colour correction circuit.

In the FIGURE, references 1R, 1G and 1B denote inputs of signal channels 2R, 2G and 2B having outputs 3R, 3G and 3B. Colour signals RS, GS and BS which correspond with the red, green and blue light components, respectively, in the light coming from an information to be recorded, are applied to the inputs 1R, 1G and 1B. The variation of the signal RS is shown versus the time and THS and THB, respectively, denote a television line scan and line blanking period, respectively. The periods THS and THB together form a television line period, not further shown. In the line scan period THS the signal RS varies linearly from a black level to a so-called peak white value, the black level being present in the line blanking period THB. In the line scan periods THS the signals GS and BS, not shown, have a variation which depends on the information content, the black level being present in the line blanking periods THB. The signals RS, GS and BS are obtained from a signal source, for example a television camera for recording a scene in a studio or outdoors. The camera then comprises, for example, a picked-up tube or a solid state recording device. The signal source may further be a component part of a converter converting a film, slide or photograph into a colour television picture. The signals RS, GS and BS may be obtained from optical detectors arranged singly or in one or more rows. Irrespective of the nature of the signal source it may be assumed that a colour correction may be desirable. The above-mentioned Auslegeschrift deals entensively with the reasons therefor.

Depending on the nature of the signal source, each of the signals RS, GS and BS is supplied with a predetermined amplitude, this signal amplitude depending on the sensitivity of the optical detector for the specific radiation. It should then hold, in a manner customary for television recording, for a local information of a white colour that the values of the corresponding red RS, green GS and blue colour signals BS are equal (R=G=B). For television reproduction it then holds that the information is displayed with a white colour when it holds for a luminance signal Y=0.30 R+0.59 G+0.11 B, assembled from the colour signals, that R=G=B. To compensate for the specific spectral sensitivity of the signal source supplying the colour signals RS, GS and BS, the input 1R, 1G and 1B are connected to amplifier circuits 4R, 4G and 4B. The amplifier circuits 4R, 4G and 4B are adjustable and are so adjusted in the presence of an information of a white colour that the output signals have an equal value (R=G=B).

The amplifier circuits 4R, 4G and 4B for adjusting an equal signal value in the presence of an information of a white colour are followed by pulse insertion circuits 5R, 5G and 5B. Inserting a pulse is done by means of a switching operation, effected under the control of a synchronizing signal TSS. The signal TSS is applied to inputs 6R, 6G and 6B of the circuits 5R, 5G and 5B and is a composite field and line synchronizing signal, of which one line synchronizing signal during one line period is shown versus the time at the input 6R. It is alternatively possible to use a signal derived from a synchronizing signal described in a standard, instead of using this synchronizing signal directly.

The circuits 5R and 5B are followed by adjustable amplifier circuits 7R and 7B, whereas the circuit 5G on the contrary is followed by a controllable amplifier circuit 7G'. Hereinafter it will become apparent that the circuits 7R, 7G' and 7B perform the colour correction to be described.

Each one of the amplifier circuits 7R, 7G' and 7B is followed by a clamping circuit 8R, 8G and 8B, respectively, having inputs 9R, 9G and 9B for receiving a clamping signal BKS which is shown at the input 9R as a function of the time. From a comparison of the signals TSS and BKS it will be apparent that the signal BKS has a smaller pulse, which occurs in the line blanking period THB after the wider pulse in the signal TSS. The signal BKS is, for example, the colour burst-keying signal in colour television. The pulses in the signals TSS and BKS may occur shifted, with a longer or shorter duration, in the line blanking periods THB, the only requirement being that they do not coincide.

The clamping circuits 8R, 8G and 8B are followed by gamma amplifier circuits 10R, 10G and 10B, respectively. The signal applied to the circuit 10R is shown versus the time and is denoted by RS'. The drawing shows that the black level in the signal RS' is fixed at the 0V ground potential by means of the clamping circuit 8R, a pulse which is inserted with a predetermined amplitude by the pulse insertion circuit 5R occurring in the line blanking period THB. RS" denotes a gamma-corrected signal supplied by the circuit 10R.

The gamma amplifier circuits 10R, 10G and 10B are followed by pulse separation circuits 11R, 11G and 11B, respectively, having inputs 12R, 12G and 12B for receiving the synchronizing signal TSS. The pulse separating circuits 11R, 11G and 11B are followed by the circuits 13R, 13G and 13B, respectively, each having two inputs 14R, 15R; 14G, 15G; and 14B, 15B, respectively, for receiving the signals $\overline{TBS}$ and TBS, respectively. At the input 15R, the signal TBS is shown versus the time with an ascending line blanking pulse which is part of a composite field and line blanking signal. The signal $\overline{TBS}$ is the inverted blanking signal. The circuits 13R, 13G and 13B are followed by the outputs 3R, 3G and 3B of the colour correction circuit.

According to a feature of the invention, the pulse separating circuits 11R, 11G and 11B are connected to inputs 16, 17 and 18 of a pulse adder and comparator circuit 19, which comprises one sole output 20. In the circuit 19 the inputs 16, 17 and 18 are connected to a (−) input of a differential amplifier 24 via resistors 21, 22 and 23, this input further being connected to the amplifier (20) via a capacitor 25. Via a resistor 26 the (+) input of the amplifier 24 is connected to the junction point of two resistors 27 and 28, which have been arranged in series between ground and a terminal carrying a voltage −U1. The voltage −U1 is obtained from a voltage source, not shown, an other terminal of which is connected to ground. The resistor 27 is of such a construction that it is adjustable, so that the resistance junction point can carry an adjustable voltage which is the reference voltage denoted by Uref. By means of the resistors 21, 22 and 23, whose values are in a predetermined ratio to one another, for example more or less in the ratio 1/0.30:1/0.59:1/0.11, a pulse addition with the reciprocal values, that is to say in the ratio 0.30:0.59:0.11 is effected, the integrating differential amplifier 24 causing a pulse amplitude comparison of the summed pulse and the reference voltage Uref, which results in a d.c. voltage Ud at the output 20.

The output 20 carrying the d.c. voltage Ud is connected to a control input 30 of the controllable amplifier circuit 7G' via a resistor 29. In the amplifier circuit 7G' the input 30 is connected to a terminal, which carries the voltage −Ua via a light-emitting diode 31. A light-dependent resistor 32 is provided near the diode 31, whereas diode 31 and resistor 32 are housed in one envelope 33. The resistor 32 and a resistor 34 form a parallel circuit arranged in series with a resistor 35 between a (−) input and the output of a differential amplifier 36. The (+) input of the amplifier 36 is connected to ground and the (−) input and the output of the amplifier 36 are the signal input and output of the amplifier circuit 7G'. Alternatively, other constructions, such as, for example, multiplying circuits may be used instead of the shown embodiment of the controllable amplifier 7G'.

In the FIGURE the signal channel 2R is shown in full detail with all its components. It is shown that the amplifier circuit 7R and also the circuit 7G' is provided with a differential amplifier 36 and a resistor 35, an adjustable resistor 37 having only been provided in series with the resistor 35. By means of the resistor 37 the gain factor of the adjustable amplifier circuit 7R can be adjusted at choice, depending on the extent to which a larger or smaller red colour component is desired in a displayed picture in correspondance with the colour signals RS, GS and BS. This can likewise be effected for the blue colour component by means of the identically constructed amplifier circuit 7B. The amplifier circuit 7G' is not adjustable but by means of the pulse adder and the comparison circuit 19 a change in the gain factor of the circuit 7R and/or 7B will be followed by a certain, opposite change of the gain factor of the circuit 7G', as the amplitude of the summed pulse at the (−) input of the amplifier 24 must remain equal to the reference voltage Uref, so that an enlargement and reduction, respectively, of the pulse in, for example, the signal RS" shown must be compensated for by a reduction and enlargement, respectively, in the corresponding signal GS", not shown. The predetermined ratio of the values of the resistors 21, 22 and 23 accomplishes that the adjusted change in the signal channel 2R or 2B results in a change which is multiplied by a predetermined factor in the signal channel 2G. For the ratio of the resistors 21, 22 and 23, given by way of example and equal to 1/0.30:1/0.59:1/0.11 it follows that an adjusted change in the signal channel 2R and 2B, respectively, causes in the signal channel 2G an opposite change equal to 0.3/0.59 and 0.11/0.59 times, respectively, the adjusted change.

The choice of the above-mentioned resistance ratio has the advantage that the change in the gain factor of the amplifier circuits 7R, 7G' and 7B does not affect the brightness of the picture, only the colour changes. To explain this let it be assumed that the gain factors of the circuits 7R, 7G' and 7B are equal and that the pulses in the line blanking periods THB in the output signal of the amplifier 10R (signal RS"), 10G and 10B are equal and have, for example a pulse amplitude equal to Up. Addition of the pulses via the resistors 21, 22 and 23 in the ratio 0.30:0.59:0.11 results in that the summed pulse has also the voltage Up. The voltage value Up deviates slightly from the reference voltage Uref (Up≈Uref) to cause the d.c. voltage Ud to be so high that the amplifier circuit 7G' had the assumed, equal gain factor.

Let it be assumed that the gain factor of the circuit 7R is increased, so that the pulse amplitude in the signal RS" obtains the value Up+Ur. As a consequence thereof the amplitude of the summed pulse increases in the first instance by a value 0.30 Ur to Up+0.30 Ur. The gain factor of the controllable amplifier circuit 7G' will now be reduced so via the circuit 19 that the amplitude decreases again to Up≈Uref. This is the case when the pulse amplitude in the signal GS", supplied by the circuit 10G decreases to Up−0.3/0.59 Ur, as it then holds again for the summed pulse that 0.30 (Up+Ur)+0.59 (Up−0.3/0.59 Ur)+0.11 Up=Up≈Uref. For the picture this means that a picture portion which originally had a white colour has now obtained a larger red and a smaller green colour component so that the picture portion now has a purplish—red colour, whereas the luminance, defined by the relation Y=0.30 R+0.59 G+0.11 B has not changed.

A following change in the gain factor of the circuit 7B results in, for example, a pulse amplitude equal to Up−Ub in the signal BS" supplied by the circuit 10B, the pulse amplitude in the signal RS" shown remaining equal to Up+Ur, whereas the summed pulse amplitude taken off in the first instance with −0.11 Up is again brought to the reference value Up≈Uref, it ultimately holding that 0.30 (Up+Ur)+0.59 (Up−0.30/0.59 Ur+0.11/0.59 Up)+0.11 (Up−Ub)=Up≈Uref. The picture portion which was originally of a white colour has ultimately become yellowish-red, after the purplish-red colour, the luminance remaining the same owing to the enlarged red and the reduced blue colour component.

In practice it is advantageous to include the controllable amplifier circuit in the green colour channel 2G as the green colour component contributes most to the luminance signal. This results in a wide range for the colour correction.

The advantage of the unchanged luminance in the colour correction is the result of the fact that the factors in the pulse addition are choosen equal to the luminance factors. It is inter alia alternatively possible to give the resistors 21, 22 and 23 the same value, which causes each gain change in a red or blue colour channel to occur to the same extent but into the opposite direction in the green colour channel.

The FIGURE shows a construction of the signal channel 2R as an example of a detailed construction of the signal channels 2R, 2G and 2B of the colour correction circuit. Via a capacitor 38 the input 1R is connected in series with a resistor 39 to an (−) input of a differential amplifier 40, the (+) input of which is connected to ground. Via an adjustable resistor 41 and a resistor 42 the (−) input of the amplifier 40 is connected to the amplifier output, which is connected to the (−) input of the amplifier 36 and a terminal of a switch 44 via a resistor 43. Thus, the amplifier circuit 4R is comprised of the components 38 to 43, inclusive.

Via a resistor 45 the other terminal of the swtich 44 is connected to a terminal, carrying the voltage −U1. The switch 44 has a switching signal input which is connected to the input 6R. The pulse insertion circuit 5R thus comprises the switch 44 and the resistor 45. The switch 44 is constructed as a bilateral switch and may, for example, be part of a quadruple bilateral switch of the Philip's type HEF 4016B. The switch 44 is closed, that is to say it conducts when the ascending pulse in the signal TSS applied thereto occurs.

Via a capacitor 46 the output of the amplifier 36 is connected to the drain of a field effect transistor 47, the source of which is connected to ground and the gate electrode to ground via a resistor 48 and to the input 9R via a capacitor 49. Thus, the clamping circuit 8R comprises the components 46 to 49, inclusive.

The junction point of the capacitor 46 and the transistor 47, which carries the signal RS' shown next to it, is connected to a resistor 50, whose other terminal is connected to a parallel arrangement of a resistor 51, of a diode 52 in series with a resistor 54 and of a series arrangement of a diode 54, a diode 55 and a resistor 56. The other terminal of the parallel arrangement (51−56) is connected to the (−) input of a differential amplifier 47, which has its (+) input connected to ground. The (−) input of the amplifier 57 is connected to the amplifier output via a resistor 58. Thus, the gamma amplifier circuit 10R comprises the components 50 to 58, inclusive and produces its gamma gain in known manner by means of the diode 52 and the series arrangement of the diodes 54 and 55.

The output of the amplifier 57 which carries the signal RS" shown next to it, is connected to a terminal of a switch 59, which is identical to the switch 44, and a switching signal input of which is connected to the input 12R of the pulse separating circuit 11R formed thus.

The junction point of the amplifier 57 and the switch 59 is connected to a terminal of an identical switch 60, the switching input of which is connected to the input 14R. The other terminal of the switch 60 is connected to the output 3R and coupled to ground via a further, identical switch 61, the switching signal input being connected to the terminal 15R. Thus, the switches 60 and 61 provide the circuit 13R. During the line scan periods THS the switches 51 and 69 are open and switch 60 is closed, causing the information in the signal RS" to become available at the output 3R. During the line blanking periods THB the switch 60 is opened and the switch 61 is closed, causing the ground potential to be supplied as the black level from the output 3R. For the duration of a line synchronizing pulse (signal TSS) occurring in the line blanking period THB, the switch 59 is closed, causing the pulse present in the signal RS" to be supplied to the input 16 of the circuit 19. In the FIGURE, the switches 44, 59, 60 and 61 are shown in the positions they occupy during the line synchronizing pulses.

In practice, the inclusion of a gamma amplifier circuit 10R, 10G and 10B in the colour correction circuit causes no problem, so that it is possible to perform simultaneously a gamma correction in addition to a colour correction.

In the signal RS' the pulse in the line blanking period THB is shown as having a value which is approximately half the peak-white value present, by way of example, at the end of the line scan period THS. If the amplifier 57 can also process values higher than the peak-white value, a pulse having the peak white value might be used instead of this picture half-tone (grey). The pulse having the above picture half-tone appears to be very satisfactory in practice.

The pulse separating circuits 11R, 11G and 11B provide, in conjunction with the pulse adder and comparator circuit 19, a signal sample-and-hold circuit (11, 19), which is of a simple construction. A certain pulse amplitude of the summed pulse can be chosen at will by adapting the reference value Uref. In a construction of the colour correction circuit according to the invention values of 20, 10 and 56 kOhm may alternatively be selected for the resistors 21, 22 and 23, respectively, which results in a ratio of 1/0.3:1/0.6:1/0.107 which, in the pulse addition, furnishes a sufficient approximation of the above-mentioned reciprocal luminance factors 0.3, 0.59 and 0.11.

Including the adjustable resistors 37 present in the amplifier circuits 7R and 7B in a so-called "joy-stick"-circuit, renders it possible to perform the desired colour correction in a simple manner by readjusting one sole control element, which may have been provided with a colour scale.

The resistor 27 in the pulse adder and comparator circuit 19 is of such a construction that it is variable for adjusting purposes for the colour correction circuit. After the resistors 41 in the amplifier circuits 4R, 4G and 4B have been set thus that, during the presence of white information the colour signals at the outputs of the circuits 4R, 4G and 4B have the same signal values and the resistors 37 in the amplifier circuit have been set to an intermediate value, the colour correction circuit is final-adjusted by means of the resistor 27.

Instead of the signals RS and BS, the so-called red colour-difference signal (R−Y)S and the blue colour-difference signal (B−Y)S might alternatively be applied to the inputs IR and IB. A pulse addition in circuit 19 in the ratio 30/59:1:11/59 = 30:59.11 results in 30/59 (R−Y)+G+11/59 (B−Y)=Y. It follows that also for this alternative signal supply the luminance (Y) remains constant when the values of resistors 21, 22 and 23 are in a ratio which is more or less equal to 1/30:1/59:1/11.

What is claimed is:

1. A television colour correction circuit comprising at least three signal channels each having an input, an output and variable amplifier circuits arranged therebetween, characterized in that each signal channel includes a pulse insertion circuit coupled to the input and inserting a pulse occurring in line blanking periods with a predetermined amplitude into the signal applied to the input, a pulse separating circuit coupled to the output and separating the said pulse from the output signal, the outputs of the pulse separating circuits being connected to inputs of a pulse adder and comparator circuit for performing a pulse addition with predetermined factors and for comparing the pulse amplitude of the summed pulse with a reference value, the d.c. voltage-carrying output of the pulse adder and comparator circuit being connected to a control input of a controllable amplifier circuit provided in one of the said signal channels, adjustable amplifier circuits having been provided in the other signal channels.

2. A television colour correction circuit as claimed in claim 1, characterized in that the signal channel comprising the controllable amplifier circuit is intended to process a colour signal corresponding with green light, two further signal channels comprising adjustable amplifier circuits being present, which are intended to process colour signals or colour-difference signals which correspond to red and blue light, respectively.

3. A television colour correction circuit as claimed in claim 2, characterized in that the said, predetermined factors at the pulse addition have a ratio which is substantially equal to 30:59:11 for the signal channels corresponding with signals of red, green and blue light, respectively.

4. A television colour correction circuit as claimed in any one of the preceding claims, characterized in that a gamma amplifier circuit is provided in the signal channel between the pulse insertion and pulse separating circuits.

5. A television colour correction circuit as claimed in claim 4, characterized in that the pulse adder and comparator circuit is included in a signal sample-and-hold circuit.

6. A television colour correction circuit as claimed in claim 5, characterized in that the signal sample-and-hold circuit comprises an integrating differential amplifier first input of which, which carries a voltage of the reference value and a second input, via resistors having different values, the resistance ratio of which correspond substantially with the reciprocal values of the said predetermined factors, are connected to outputs of the pulse separating circuits in the signal channels, these circuits being part of the signal sample-and-hold circuit.

* * * * *